(12) United States Patent
Bates et al.

(10) Patent No.: US 9,164,871 B2
(45) Date of Patent: Oct. 20, 2015

(54) EVALUATION OF STATEMENT-LEVEL BREAKPOINTS

(71) Applicant: International Business Machines Corporation, Armonk, NY (US)

(72) Inventors: Cary L. Bates, Rochester, MN (US); XiaoLing Chen, Beijing (CN); Wang Fan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/896,447

(22) Filed: May 17, 2013

(65) Prior Publication Data

US 2014/0344790 A1    Nov. 20, 2014

(51) Int. Cl.
*G06F 9/44*    (2006.01)
*G06F 11/36*    (2006.01)

(52) U.S. Cl.
CPC ............ *G06F 11/3636* (2013.01); *G06F 11/36* (2013.01); *G06F 11/3624* (2013.01)

(58) Field of Classification Search
CPC .. G06F 11/3636; G06F 11/36; G06F 11/3624
See application file for complete search history.

(56) References Cited

U.S. PATENT DOCUMENTS

| | | | |
|---|---|---|---|
| 6,077,312 A | | 6/2000 | Bates et al. |
| 8,245,212 B2* | | 8/2012 | Steiner .......................... 717/158 |
| 2003/0061599 A1* | | 3/2003 | Bates et al. ................... 717/129 |
| 2003/0149961 A1* | | 8/2003 | Kawai et al. .................. 717/129 |
| 2006/0200807 A1* | | 9/2006 | Bates et al. ................... 717/129 |
| 2007/0074168 A1* | | 3/2007 | Bates et al. ................... 717/124 |
| 2007/0168972 A1 | | 7/2007 | Bates et al. |
| 2008/0120605 A1* | | 5/2008 | Rosen ........................... 717/129 |
| 2012/0047486 A1* | | 2/2012 | Ashish et al. ................. 717/106 |
| 2012/0047493 A1* | | 2/2012 | Ashish et al. ................. 717/129 |
| 2012/0096437 A1 | | 4/2012 | Bates et al. |
| 2012/0110553 A1* | | 5/2012 | Bates et al. ................... 717/129 |
| 2012/0110554 A1* | | 5/2012 | Bates et al. ................... 717/129 |
| 2012/0254666 A1* | | 10/2012 | Liu et al. ......................... 714/34 |
| 2012/0297173 A1* | | 11/2012 | Tudor et al. .................... 712/227 |
| 2013/0247007 A1* | | 9/2013 | Fuhrer et al. .................. 717/129 |
| 2013/0318504 A1* | | 11/2013 | Eker et al. ...................... 717/128 |

OTHER PUBLICATIONS

Mark A. Linton, The Evolution of Dbx, [Online] Jun. 1990, USENIX Summer, [Retrieved from the Internet] <http://citeseerx.ist.psu.edu/viewdoc/download?doi=10.1.1.38.5985&rep=rep1&type=pdf> pp. 211-220.*

(Continued)

*Primary Examiner* — Thuy Dao
*Assistant Examiner* — Ravi K Sinha
(74) *Attorney, Agent, or Firm* — James R. Nock; Nicholas D. Bowman (57) ABSTRACT

A method for evaluating a breakpoint in a line of source code includes encountering the breakpoint and evaluating whether the breakpoint is at the start of the line. If the breakpoint is at the start of the line, then the debugger stops at the breakpoint and tracks the breakpoint. If the breakpoint is not at the start of the line, then the debugger evaluates whether the breakpoint is reached via a back branch. If the breakpoint is not at the start of the line and is reached via a back branch, then the debugger stops at the breakpoint and tracks the breakpoint. If the breakpoint is not at the start of the line and is not a back branch target, then the debugger passes the breakpoint and tracks the breakpoint.

15 Claims, 6 Drawing Sheets

(56) References Cited

OTHER PUBLICATIONS

Agrawal, H.; De Millo, R.A.; Spafford, E.H., An execution-backtracking approach to debugging, [Online] May 1991, Software, IEEE, vol. 8, No. 3, [Retrieved from the Internet] <http://ieeexplore.ieee.org/stamp/stamp.jsp?tp=&arnumber=88940&isnumber=2900> pp. 21-26.*

Mireille Ducassé. Coca: an automated debugger for C, [Online] 1999, In Proceedings of the 21st international conference on Software engineering (ICSE '99). ACM, New York, NY, USA, [Retrieved from the Internet] <http://doi.acm.org/10.1145/302405.302682> pp. 504-513.*

ARM, "RealView Debugger User Guide, Version 3.0", ARM, Copyright © 2002-2006 ARM Limited. infocenter.arm.com/help//index.jsp?topic=/com.arm.doc.dui0153h/BABDICEF.html.

\* cited by examiner

| Statement | Breakpoint Record | Debugger Action |
|---|---|---|
| L1ST1 | [None] | Stop, Add |
| L1ST2 | L1ST1 | Pass, Add |
| L1ST3 | L1ST1, L1ST2 | Pass, Add |
| L2ST1 | [None] | Stop, Add |
| L2ST2 | L2ST1 | Pass, Add |
| L2ST3 | L2ST1, L2ST2 | Pass, Add |
| L2ST2 | L2ST1, L2ST2, L2ST3 | Stop, Clear, Add |
| L2ST3 | L2ST2 | Pass, Add |
| L3ST1 | [N/A] | [No Breakpoint] |
| L3ST2 | [N/A] | [No Breakpoint] |
| L3ST3 | [N/A] | [No Breakpoint] |
| L4ST1 | [None] | Stop, Add |
| L4ST2 | L4ST1 | Pass, Add |
| L4ST3 | L4ST2 | Pass, Add |

FIG. 6

EVALUATION OF STATEMENT-LEVEL BREAKPOINTS

TECHNICAL FIELD

This disclosure relates to debugger breakpoints. In particular, it relates to a debugger that evaluates breakpoints efficiently and consistently on a line of source code.

BACKGROUND

A debugger is a computer program used to detect and correct errors in a target computer program. Most debuggers have a feature that allows a user to stop execution of the target computer program and analyze variables in the program. A user may stop execution of the program by setting a breakpoint at a desired location in the program and allowing the program to run up to the breakpoint.

Typically, a debugger will implement a software breakpoint through an opcode replacement, through which the opcode of an instruction may be replaced with an invalid opcode or an opcode specifically designated as a breakpoint opcode. When the program runs and the debugger encounters the breakpoint, the invalid or breakpoint opcode may cause an exception. The debugger gains control of the program, handles the exception, and stops execution of the program until a user resumes the program. When the breakpoint is removed, the displaced opcode is replaced.

When a user sets a breakpoint on a line of source code, the debugger creates the breakpoint at the beginning of the first statement associated with the source line. When program execution comes to the breakpoint, the breakpoint fires and program execution halts before any statements on the source line are executed. A line of source code may contain multiple statements, with each statement corresponding to one or more machine instructions generated by the compiler. When the compiler generates debuggable code for the debugger, as opposed to optimized code, it does so that the debugger can stop at statement boundaries and retrieve variables. If the debugger was to stop in the middle of a statement, the variable value may not be accurate, as the statement would not be executed through the machine instructions associated with that statement, and variable values may reside in registers and temporary memory locations. When a breakpoint is set on a statement, it is set on the first instruction associated with the statement.

SUMMARY

In embodiments of the invention, a method for setting and evaluating a line breakpoint on a line of source code includes setting a breakpoint at the start of each statement within the line, encountering one of the breakpoints and determining whether the breakpoint is at the start of the line or was reached as a result of a back branch. If the breakpoint is at the start of the line, then the debugger stops at the breakpoint and tracks the breakpoint. If the breakpoint is not at the start of the line, then the debugger determines whether the breakpoint is reached via a back branch. If the breakpoint is not at the start of the line and is reached via a back branch, then the debugger stops at the breakpoint and tracks the breakpoint. If the breakpoint is not at the start of the line and is not reached via a back branch, then the debugger passes the breakpoint and tracks the breakpoint.

In another embodiment of the invention a method for debugging a line of source code in a program includes setting breakpoints on the line, running the program, and encountering a current breakpoint. The debugger determines whether the current breakpoint is at the start of the line. If the current breakpoint is at the start of the line, then the debugger stops at the current breakpoint, tracks the current breakpoint, and returns to running the program when a user sends a command to resume program execution. If the current breakpoint is not at the start of the line, then the debugger determines whether the breakpoint is reached via a back branch. If the current breakpoint is not at the start of the line and is reached via a back branch, then the debugger stops at the current breakpoint, tracks the current breakpoint, and returns to running the program when a user sends a command to resume program execution. If the breakpoint is not at the start of the line and is not reached via a back branch, then the debugger tracks the breakpoint and returns to encountering a current breakpoint.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIGS. 1A, 1B, and 1C are examples of operations involving debuggers and breakpoints.

DETAILED DESCRIPTION

A line of source code may include a branch instruction that loops back to an earlier point on the line so that the branch's target instruction and any instructions in the loop are executed multiple times until a condition is met. This branch back to a previous instruction on the line may be referred to as a "back branch", and its target instruction as a "back branch target". There are different methods of executing a back branch, such as while and do while loops, that may lead to the same operational result. However, when a breakpoint is placed on a line having a loop instruction, the breakpoint may cause inconsistent debugging operation due to the method in which the loop is executed. A loop instruction may or may not branch back to the instruction having the breakpoint, depending on the form of the loop instruction.

For example, consider the following two loops in a line of source code, in which a breakpoint is placed on the first statement in each line:

Logically, in the while loop above, the condition is evaluated first and the function is executed. In practice, the debugger encounters the machine instructions associated with the while statement every iteration of the function. Compilers generated while statements as if they were coded as follows:

```
if(i!=3)
{
  do
    foo(&i)
  while(i!=3)
}
```

When a breakpoint is set on the line containing the while loop, the breakpoint is placed on the first instruction of the while statement, as it is the first statement of the line. The debugger may only hit the breakpoint before it executes the line, and may only execute the function statement during a loop iteration, not the while statement, as execution does not flow through the first machine instruction associated with the first statement as the loop iterates.

Logically, in the do while loop, the function is executed first and the condition evaluated. In contrast to the while loop, the breakpoint is placed on the function statement for the do while loop, as it is the first statement of the line. This may lead to the function executing every time the loop iterates, and the debugger hitting the breakpoint on each loop iteration. This inconsistent operation of the debugger for loop statements may lead to a loss of control for most users that are not aware of how the debugger works or the program is compiled.

An alternative to setting a breakpoint by line may be to set a statement-level breakpoint on every statement of a line. Under such a set-up, a user may retain control over the debugger program. However, it is inefficient and time-consuming to step through every statement on a line. As a tool, a debugger should be consistent so as to be reliable and efficient so as to be useful.

Figure 1A:
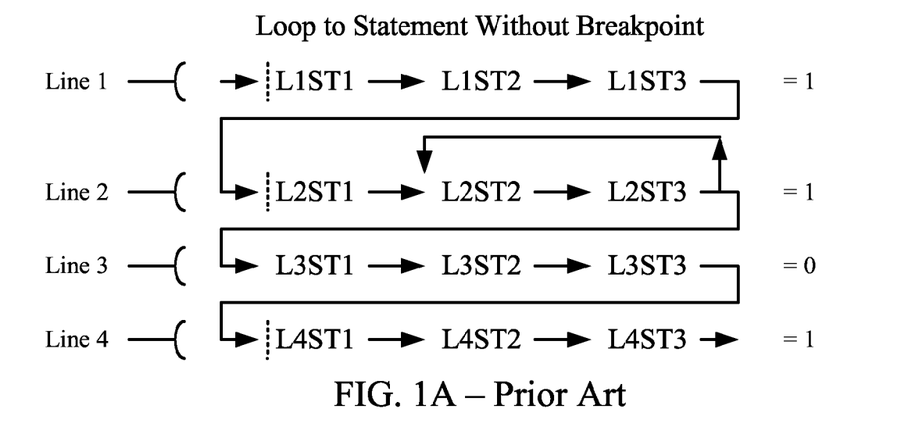
FIG. 1A is a diagram of program execution where the loop statement loops back to a statement that does not contain a breakpoint.
Figure 1B:
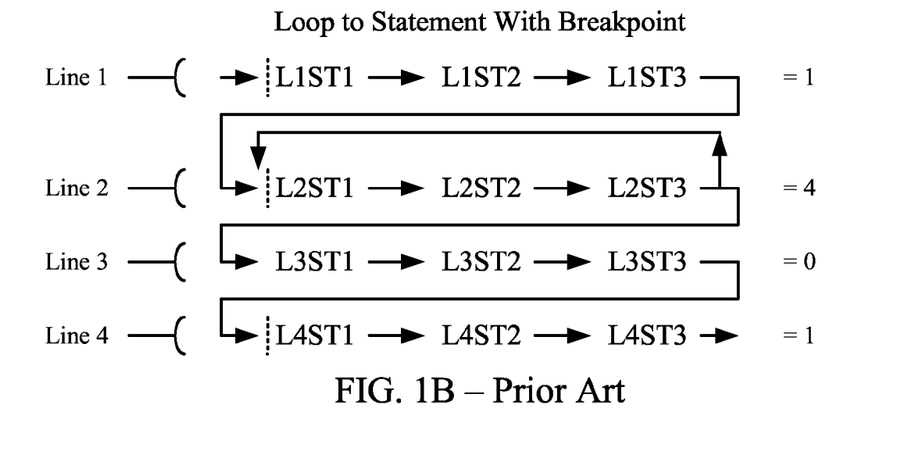
FIG. 1B is a diagram of program execution where the loop statement loops back to a statement that does contain a breakpoint.
Figure 1C:
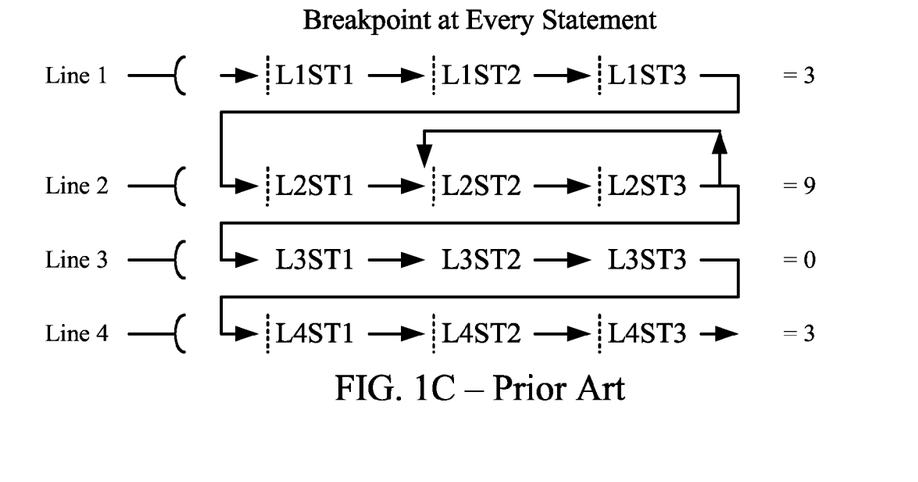
FIG. 1C is a diagram of program execution where the debugger sets a breakpoint on every statement.

FIGS. 1A, 1B, and 1C are examples of operations involving debuggers and breakpoints that illustrate current debugger operations. Each word L|X|ST|Y represents a statement within a line, with the "X" representing the line number and the "Y" representing the statement number in the line. The arrows show the flow of the program through the four lines. There is one loop statement, L2ST3, which loops back for 3 iterations. Corresponding to lines with a line breakpoint are statements breakpoints, denoted by dashed vertical lines in front of the statement on which they are placed. Line breakpoints have been placed on lines 1, 2, and 4. There is no line breakpoint on line 3.

FIG. 1A is a diagram of program execution where the loop statement loops back to a statement that does not contain a breakpoint. The debugger sets a breakpoint on the first statement of every line for which a user has set a breakpoint. The debugger stops at L1ST1, as it has a breakpoint. After the user continues the program execution, the debugger stops at L2ST1, as it has a breakpoint. When the user executes the remaining instructions on line 2, the debugger loops back to L2ST2 three times, but does not stop, as there is no breakpoint on L2ST2. The debugger continues through line 3, as it does not have a breakpoint set on the line, and stops at L4ST1, as it contains a breakpoint. The total number of times the debugger stops is 3—once on each line having a breakpoint.

FIG. 1B is a diagram of program execution where the loop statement loops back to a statement that does contain a breakpoint. The process is the same as above up until the debugger encounters the loop statement, L2ST3. In this instance, L2ST3 loops back to L2ST1, which contains a breakpoint. The debugger stops at the breakpoint, and the user may continue program execution. The debugger will stop for all three iterations, after which it will continue to L4ST1 and stop. The total number of times the debugger stops is 6—once for each line having a breakpoint and three times for each iteration of the loop.

FIG. 1C is a diagram of program execution where the debugger sets a breakpoint on every statement. In this instance, loop operation is consistent for different loop statements. However, as every statement on a breakpoint line contains a breakpoint, the debugger will stop at every statement, including for all three repeats of the loop. The total number of times the debugger stops is 15—once for each statement on a breakpoint line and twice for each iteration of the loop.

Debugger Method for Evaluating a Breakpoint

According to embodiments of the invention, a debugger may efficiently evaluate a breakpoint so that the debugger exhibits consistent breakpoint behavior on a line of code. The debugger may track execution of instructions on a line so that the debugger may consistently stop at certain locations and for certain operations, while allowing the user to parse through code without stopping at every statement. The debugger may stop at the beginning of a line of source code and at the target of a back branch, such as a loop, within the line of source code. A debugger utilizing this method may exhibit consistent behavior for loop statements having different forms.

Figure 2:
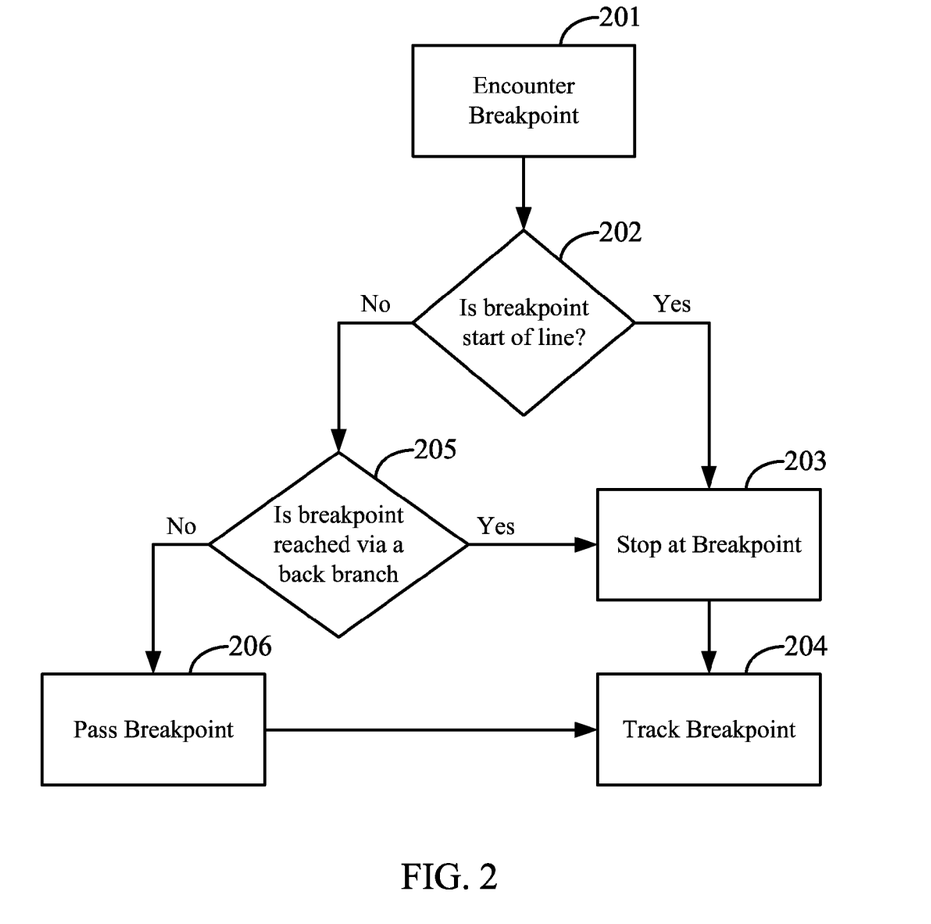
FIG. 2 is a diagram of a method for evaluating a breakpoint in a line of source code, according to embodiments of the invention.

FIG. 2 is a diagram of a method for evaluating a breakpoint on a line of source code, according to embodiments of the invention. The line of source code may contain a statement-level breakpoint on every statement in the line. When a debugger encounters a breakpoint, as in 201, it determines whether the breakpoint is at the start of the line, as in 202. If the breakpoint is at the start of the line, the debugger stops at the breakpoint, as in 203, and tracks the breakpoint, as in 204. If the breakpoint is not at the start of the line, the debugger determines whether the breakpoint statement is reached via a back branch, as in 205. If the breakpoint statement is reached via a back branch, the debugger stops at the breakpoint, as in 203, and tracks the breakpoint, as in 204. If the breakpoint statement is not reached via a back branch, the debugger passes the breakpoint, as in 206, and tracks the breakpoint, as in 204.

By tracking which statements have been previously executed on a line, the debugger may stop when it reaches a new line or encounters a previously executed instruction on the line. After the debugger stops, it may reset its tracking record so that it will only stop once for every iteration of the loop or when it runs to the next breakpoint on a new line. This method allows a user to predictably stop at every iteration of a loop, regardless of the loop method or point to which the loop branches back to. At the same time, the user does not have to parse through source code, statement by statement.

The determinations of whether a breakpoint is at the start of a line, as in 202, and whether the breakpoint statement is reached via a back branch, as in 205, may be interchanged or performed simultaneously, along with their corresponding conclusions. The relevant method determinations are whether a breakpoint starts a line, whether a breakpoint is reached via a back branch, and whether a breakpoint is neither of those two, regardless of the order in which they are determined.

Figure 3:
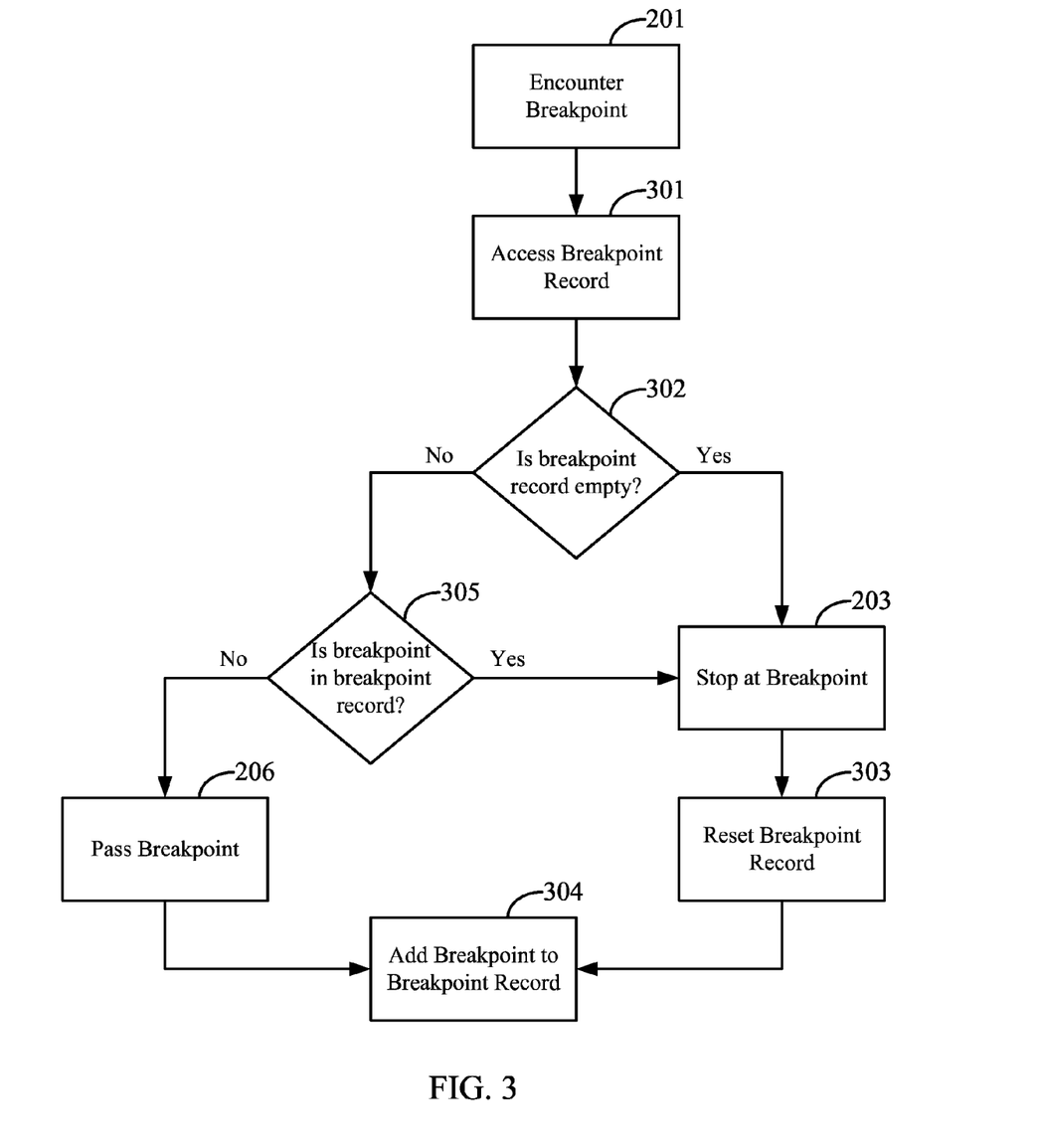
FIG. 3 is a diagram of a method for evaluating a breakpoint in a line of source code using a breakpoint record, according to embodiments of the invention.

FIG. 3 is a diagram of a method for evaluating a statement-level breakpoint in a line of source code using a breakpoint record, according to embodiments of the invention. In 201, a program encounters a breakpoint. The breakpoint may be an opcode replace or other breakpoint method that modifies an instruction on a line of code.

In 301, a debugger accesses a breakpoint record associated with the line breakpoint for which the statement-level breakpoints have been set. The breakpoint record tracks which statement-level breakpoints have been encountered for a line of source code. The breakpoint record may be a data structure that holds the executed statements of the line of source code. There is a breakpoint record for each line of code. Alternatively, if it is desired that code be evaluated in groups of five lines, a breakpoint record could be associated with a group of five lines, with the debugger making stops corresponding to the beginning of a group and back branches in the group.

In 302, the debugger determines whether the breakpoint record is empty. The breakpoint record is empty if it does not contain any breakpoints associated with the line. This includes a breakpoint record that has no breakpoints at all or no breakpoints corresponding to the line of source code. If the breakpoint record for a line is empty, then the breakpoint may be at the start of the line, as no breakpoints have yet been encountered. If the breakpoint record is empty, the debugger may stop at the breakpoint, as in 203. After the debugger stops execution of the program, it may reset the breakpoint record, as in 303. Resetting the breakpoint record may cause the debugger to only stop at the beginning of a back branch, such as a loop, without stopping again at every statement in the iteration. Resetting the breakpoint record may involve clearing the breakpoint record of all breakpoints associated with the line or, if the breakpoint record is empty, maintaining an empty breakpoint record. The breakpoint is added to the breakpoint record, as in 304.

If the breakpoint record is not empty, the debugger may evaluate whether the breakpoint is in the breakpoint record, as in 305. If the breakpoint is in the breakpoint record, then the breakpoint has already been encountered, as in a back branch, and the debugger may stop at the breakpoint, as in 203. After the debugger stops execution of the program, it may reset the breakpoint record, as in 303, and add the breakpoint to the breakpoint record, as in 304. If the breakpoint is not in the breakpoint record, then the debugger passes the breakpoint, as in 206, and adds the breakpoint to the breakpoint record, as in 304.

Debugger Method for Evaluating Lines of Code

Figure 4:
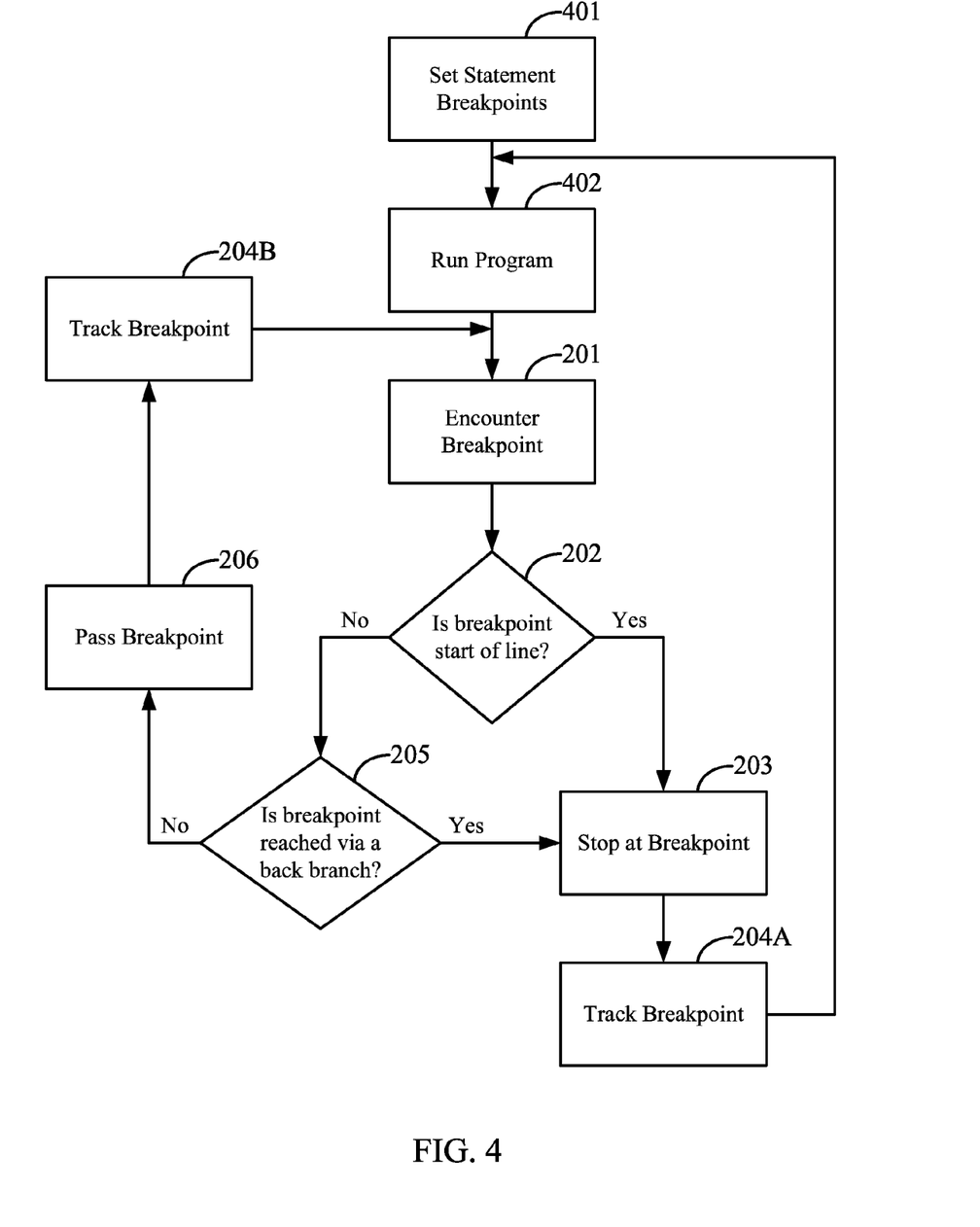
FIG. 4 is a diagram of a method for debugging a line of source code, according to embodiments of the invention.

FIG. 4 is a diagram of a method for debugging a line of source code, according to embodiments of the invention. A user places a line breakpoint on one or more lines, and the debugger sets statement breakpoints on each statement of the selected lines, as in 401. The user then runs the program with a debugger, as in 402.

When the program encounters a breakpoint, as in 201, the debugger determines whether the breakpoint is at the start of the line, as in 202. If the breakpoint is at the start of the line, the debugger stops at the breakpoint, as in 203, and tracks the breakpoint, as in 204A. When the user runs the program again, as in 402, the program returns to executing until the debugger encounters a breakpoint, as in 201. If the breakpoint is not at the start of the line, the debugger determines whether the breakpoint is reached via a back branch, as in 205. If the breakpoint is reached via a back branch, the debugger stops at the breakpoint, as in 203, tracks the breakpoint, as in 204A, and continues program execution when the user runs the program again, as in 402. If the breakpoint is not reached via a back branch, the debugger passes the breakpoint, as in 206, and tracks the breakpoint, as in 204B. The program continues executing instructions until the debugger encounters a breakpoint, as in 201.

Figure 5:
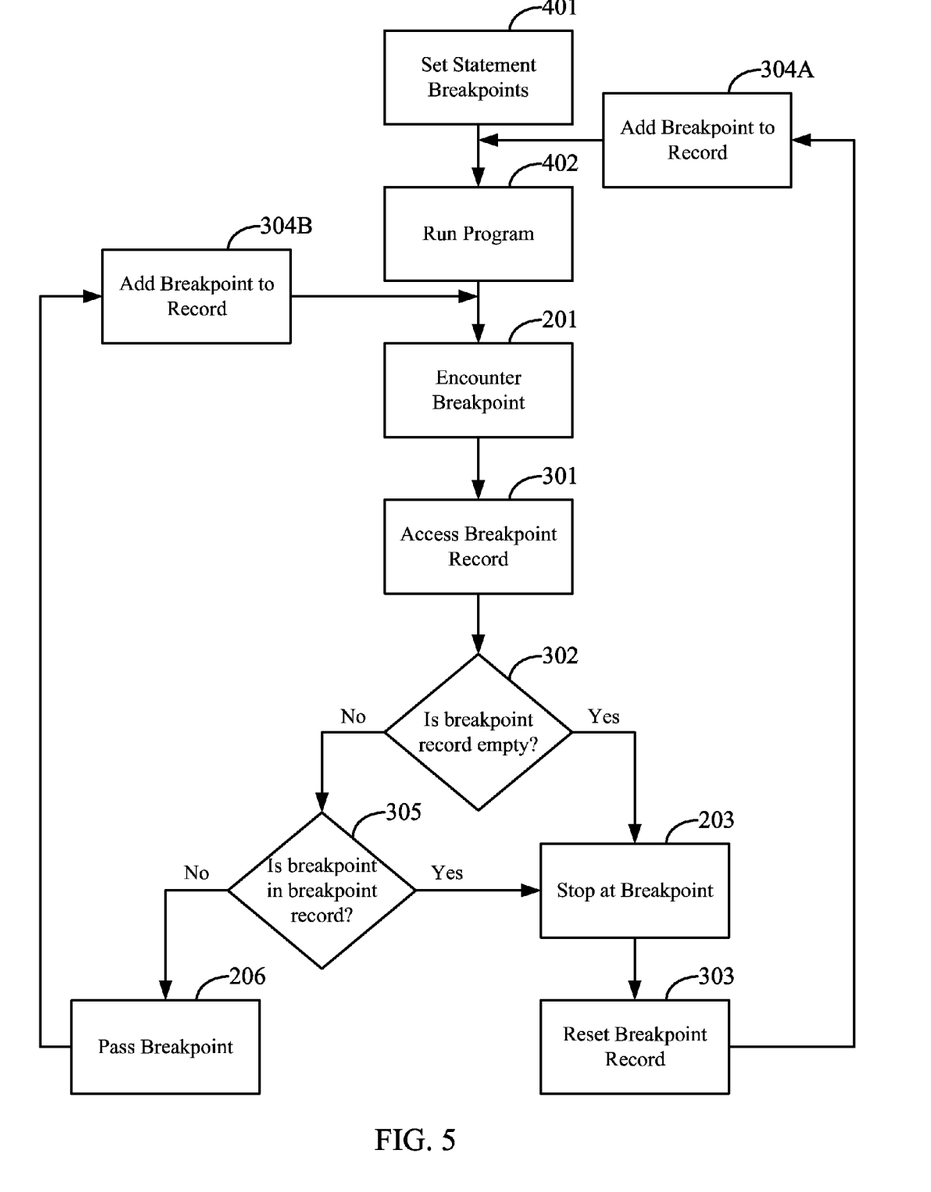
FIG. 5 is a diagram of a method for debugging a line of source code using a breakpoint record, according to embodiments of the invention.

FIG. 5 is a diagram of a method for debugging a line of source code, according to embodiments of the invention. A user places a line breakpoint on one or more lines of a program, and a debugger places statement breakpoints on each statement of the selected lines, as in 401. The user then runs the program, as in 402.

In 201, the program encounters a breakpoint. In 301, the debugger accesses a breakpoint record associated with the line breakpoint for which the statement-level breakpoints have been set. In 302, the debugger determines whether the breakpoint record is empty. If the breakpoint record is empty, the debugger may stop at the breakpoint, as in 203. After the debugger stops execution of the program, it may reset the breakpoint record, as in 303. The breakpoint is added to the breakpoint record, as in 304A. When the user runs the program again, as in 402, the program returns to executing until the program encounters a breakpoint, as in 201.

If the breakpoint record is not empty, the debugger may determine whether the breakpoint is in the breakpoint record, as in 305. If the breakpoint is in the breakpoint record, the debugger may stop at the breakpoint, as in 203. After the debugger stops execution of the program, it may reset the breakpoint record, as in 303, add the breakpoint to the breakpoint record, as in 304A, and continue program execution when the user runs the program again, as in 402. If the breakpoint is not in the breakpoint record, then the debugger passes the breakpoint, as in 206, and adds the breakpoint to the breakpoint record, as in 304B. The program continues executing instructions until the debugger encounters a breakpoint, as in 201.

Exemplary Method

Figure 6:
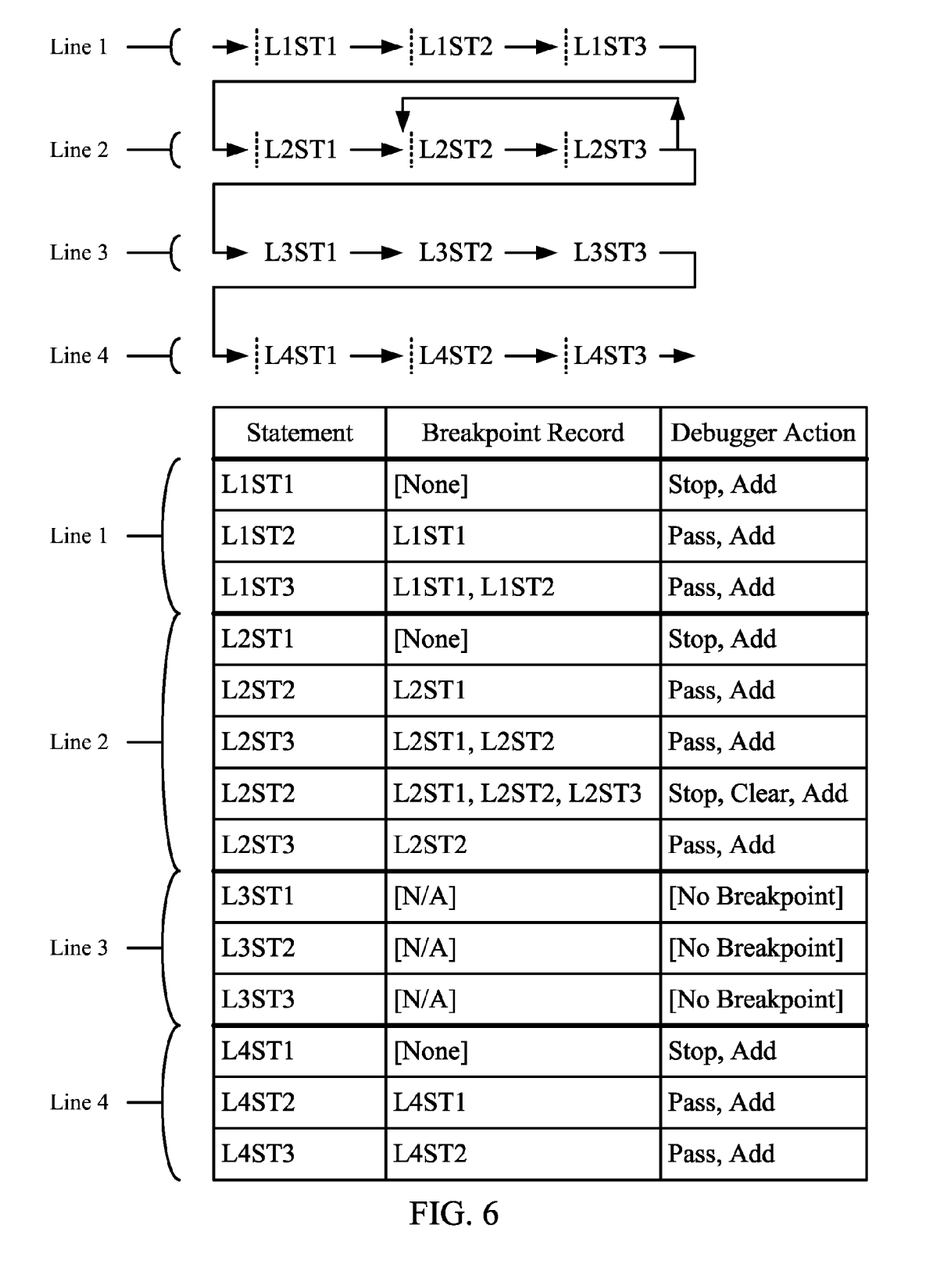
FIG. 6 is an example of a method for evaluating breakpoints on several lines of source code using a breakpoint record, according to embodiments of the invention.

FIG. 6 is an example of a method for evaluating breakpoints on several lines of source code using a breakpoint record, according to embodiments of the invention. Each word L|X|ST|Y represents a statement within a line, with the "X" standing for the line number and the "Y" standing for the statement number in the line. The arrows show the flow of the program through the four lines. There is one statement, L2ST3, which loops back to L2ST2 for one iteration. The table below the program flow contains entries for each statement, each breakpoint record of the lines, and each debugger action upon encountering a statement with a breakpoint. Line breakpoints have been placed on lines 1, 2, and 4. Corresponding to lines with a line breakpoint are statements breakpoints (step 401), denoted by dashed vertical lines in front of the statement on which they are placed. There is no line breakpoint on line 3. All step references are to FIG. 5.

The user starts execution of the program (step 402) and the debugger encounters L1ST1 (step 201), which has a statement breakpoint. The debugger accesses the line 1 breakpoint record (step 301) and evaluates whether the breakpoint record is empty (step 302). The breakpoint record is empty, as statement L1ST1 is the first statement on the line. The debugger stops at L1ST1 (step 203) and resets the breakpoint record. In this case, the breakpoint record is already empty, so resetting the breakpoint record involves keeping the breakpoint record for the line at its current condition. The debugger adds L1ST1 to the breakpoint record (304A). When the user resumes execution of the program (step 402), the debugger encounters L1ST2 (step 201), which has a statement breakpoint. The debugger accesses the line 1 breakpoint record (step 301) and evaluates whether the breakpoint record is empty (step 302). The breakpoint record is not empty, as L1ST1 was added by the debugger in the previous debugger action. The debugger evaluates whether the L1ST2 breakpoint is in the breakpoint record (step 305). The only breakpoint in the breakpoint record is L1ST1, so the debugger passes L1ST2 without stopping (step 206) and adds L1ST2 to the breakpoint record (step 304B). L1ST3 is evaluated similarly to L1ST2.

In Line 2, the debugger encounters L2ST1 (step 201) and accesses the line 2 breakpoint record (301). The line 2 breakpoint record is empty, as it is not associated with the line 1 breakpoint record. The debugger continues to handle the breakpoint at L2ST1 like L1ST1 above and the breakpoints at L2ST2 and L2ST3 like L1ST2 above. However, L2ST3 loops back to L2ST2. The debugger encounters L2ST2 for a second time (step 201) and accesses the line 2 breakpoint record (step 301). In contrast to the first time L2ST2 breakpoint was encountered, the debugger finds L2ST2 in the breakpoint record, as it was previously encountered and added to the breakpoint record. The debugger stops at L2ST2 (step 203) and resets the breakpoint record for line 2 (step 303). Unlike the first statement of the line, where the breakpoint record was empty, resetting the breakpoint record after a back branch involves clearing the breakpoint record. After the breakpoint record is reset, L2ST2 is added to the breakpoint record.

When the user resumes execution of the program (402), the program continues execution through line 2, as the loop only looped back once, and continues to line 3. Line 3 does not have a line breakpoint, and so contains no statement breakpoints. The debugger encounters no breakpoints, and continues to line 4, which is treated in the same way as line 1, which contained no back branches. The total number of times the debugger stopped execution of the program was 4—once per line breakpoint and once per loop iteration. If the loop had gone through 3 iterations, as in the example of FIGS. 1A, 1B, and 1C, the debugger using the method described above would have stopped 6 times, regardless of the form of the loop and significantly less than a stop-at-every-statement method.

Although the present invention has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the invention.

What is claimed is:

1. A method for evaluating a breakpoint in a line of source code in a program, comprising:
    encountering the breakpoint;
    determining whether the breakpoint is at a start of the line;
    if the breakpoint is at the start of the line, then stopping at the breakpoint, retrieving and analyzing variables in the program, and tracking the breakpoint;
    if the breakpoint is not at the start of the line, then determining whether the breakpoint is reached via a back branch;
    if the breakpoint is reached via a back branch, then stopping at the breakpoint, retrieving and analyzing variables in the program, and tracking the breakpoint; and
    if the breakpoint is not reached via a back branch and is not at the start of the line, then passing the breakpoint without retrieving and analyzing variables in the program and tracking the breakpoint.

2. The method of claim 1, further comprising accessing a breakpoint record for the line of source code.

3. The method of claim 2, wherein:
    determining whether the breakpoint is at the start of the line comprises determining whether the breakpoint record is empty; and
    determining whether the breakpoint is reached via a back branch comprises determining whether the breakpoint is in the breakpoint record.

4. The method of claim 3, wherein:
    tracking the breakpoint if the breakpoint is at the start of the line comprises:
        resetting the breakpoint record;
        adding the breakpoint to the breakpoint record after the breakpoint record has been reset;
    tracking the breakpoint if the breakpoint is not at the start of the line and is a back branch comprises:
        resetting the breakpoint record;
        adding the breakpoint to the breakpoint record after the breakpoint record has been reset; and
    tracking the breakpoint if the breakpoint is not at the start of the line and is not a back branch comprises adding the breakpoint to the breakpoint record.

5. The method of claim 4, wherein resetting the breakpoint record if the breakpoint is not at the start of the line and is reached via a back branch comprises clearing the breakpoint record.

6. A method for debugging a line of source code in a program with a debugger, comprising:
    setting breakpoints on the line;
    running the program;
    encountering a current breakpoint;
    determining whether the current breakpoint is at a start of the line;
    if the current breakpoint is at the start of the line, then:
        stopping at the current breakpoint;
        tracking the current breakpoint;
        returning to running the program when a user sends a command to resume program execution;
    if the current breakpoint is not at the start of the line, then determining whether the breakpoint is reached via a back branch;
    if the current breakpoint is reached via a back branch, then:
        stopping at the current breakpoint;
        tracking the current breakpoint;
        returning to running the program when the user sends a command to resume program execution;
    if the breakpoint is not reached via a back branch and is not at the start of the line, then:
        tracking the breakpoint; and
        returning to running the program without stopping at the current breakpoint.

7. The method of claim 6, further comprising accessing a breakpoint record for the line of source code.

8. The method of claim 7, wherein:
    determining whether the breakpoint is at the start of the line comprises determining whether the breakpoint record is empty; and
    determining whether the breakpoint is reached via a back branch comprises determining whether the breakpoint is in the breakpoint record.

9. The method of claim 8, wherein:
    tracking the breakpoint if the breakpoint is at the start of the line comprises:
        resetting the breakpoint record;
        adding the breakpoint to the breakpoint record after the breakpoint record has been reset;

tracking the breakpoint if the breakpoint is not at the start of the line and is a back branch comprises:
   resetting the breakpoint record;
   adding the breakpoint to the breakpoint record after the breakpoint record has been reset;
tracking the breakpoint if the breakpoint is not at the start of the line and is not a back branch comprises adding the breakpoint to the breakpoint record.

10. The method of claim 9, wherein resetting the breakpoint record if the breakpoint is not at the start of the line and is reached via a back branch comprises clearing the breakpoint record.

11. A system for debugging a line of source code in a program with a debugger, the system comprising a computer configured to perform a method comprising:
   setting breakpoints on the line;
   running the program;
   encountering a current breakpoint;
   determining whether the current breakpoint is at a start of the line;
   if the current breakpoint is at the start of the line, then:
     stopping at the current breakpoint;
     tracking the current breakpoint;
     returning to running the program when a user sends a command to resume program execution;
   if the current breakpoint is not at the start of the line, then determining whether the breakpoint is reached via a back branch;
   if the current breakpoint is reached via a back branch, then:
     stopping at the current breakpoint;
     tracking the current breakpoint;
     returning to running the program when the user sends a command to resume program execution;
   if the breakpoint is not reached via a back branch and is not at the start of the line, then:
     tracking the breakpoint; and
     returning to running the program without stopping at the current breakpoint.

12. The system of claim 11, wherein the method further comprises accessing a breakpoint record for the line of source code.

13. The system of claim 12, wherein:
determining whether the breakpoint is at the start of the line comprises determining whether the breakpoint record is empty; and
determining whether the breakpoint is reached via a back branch comprises determining whether the breakpoint is in the breakpoint record.

14. The system of claim 13, wherein:
tracking the breakpoint if the breakpoint is at the start of the line comprises:
   resetting the breakpoint record;
   adding the breakpoint to the breakpoint record after the breakpoint record has been reset;
tracking the breakpoint if the breakpoint is not at the start of the line and is a back branch comprises:
   resetting the breakpoint record;
   adding the breakpoint to the breakpoint record after the breakpoint record has been reset;
tracking the breakpoint if the breakpoint is not at the start of the line and is not a back branch comprises adding the breakpoint to the breakpoint record.

15. The system of claim 14, wherein resetting the breakpoint record if the breakpoint is not at the start of the line and is reached via a back branch comprises clearing the breakpoint record.

* * * * *